Nov. 22, 1938. W. A. HEYMAN 2,137,243
ARTICLE MADE FROM PERFORATED CELLULOSE SHEETS
Filed April 20, 1936 3 Sheets-Sheet 1
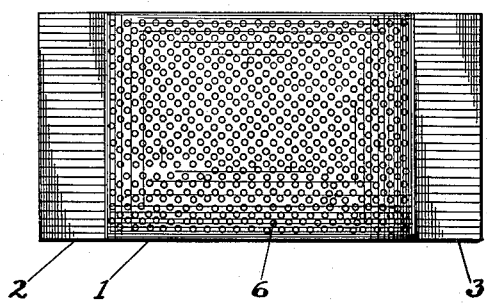
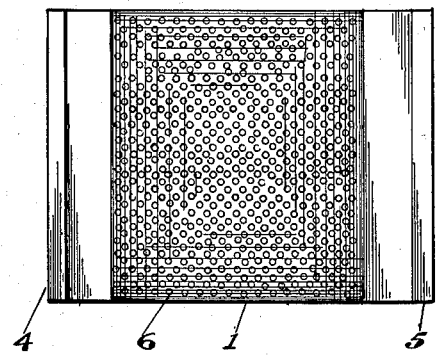
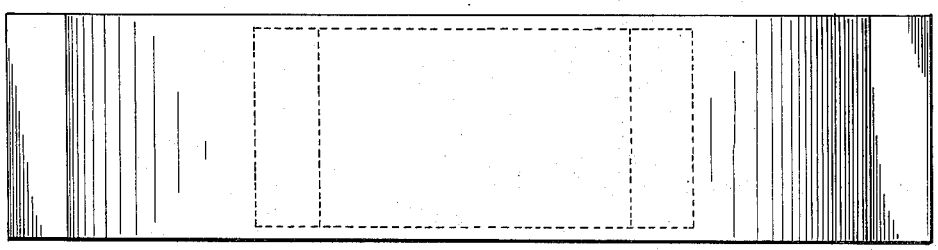
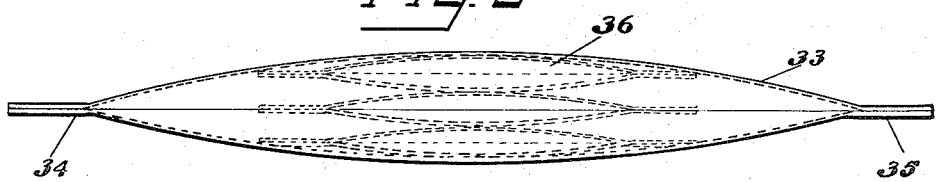
INVENTOR.
WILBERT A. HEYMAN
BY
ATTORNEY.

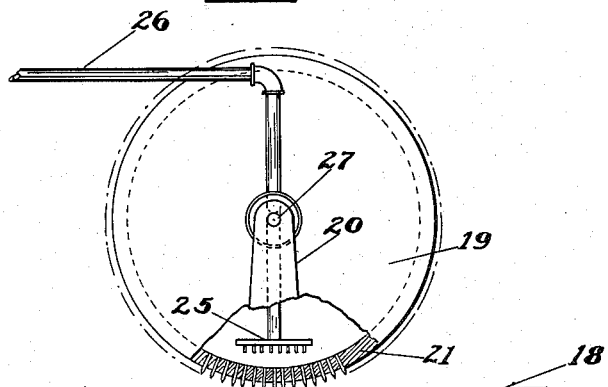
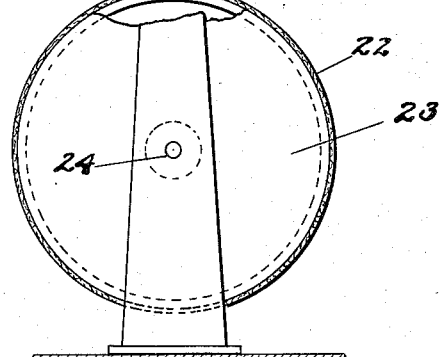
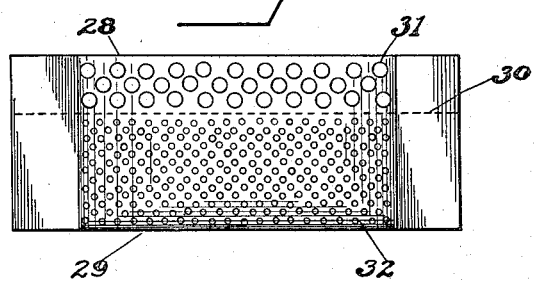

Nov. 22, 1938.　　　W. A. HEYMAN　　　2,137,243
ARTICLE MADE FROM PERFORATED CELLULOSE SHEETS
Filed April 20, 1936　　3 Sheets-Sheet 3
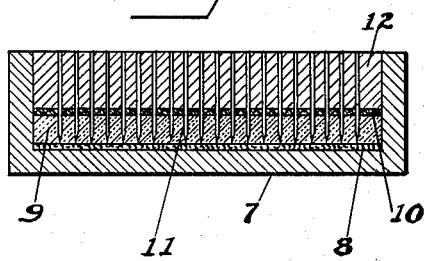
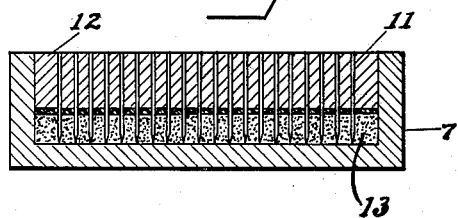
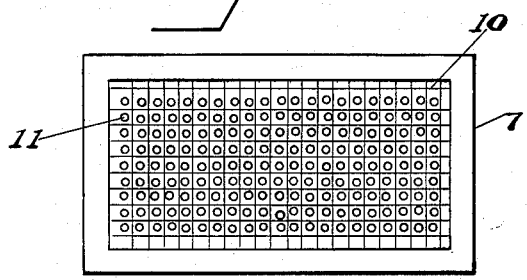
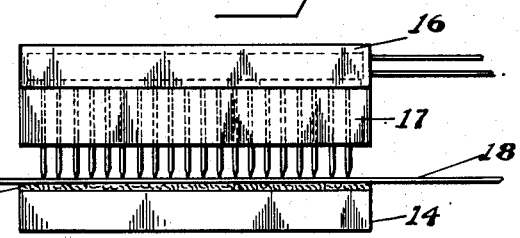
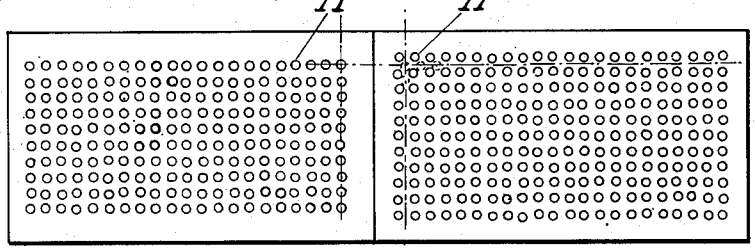
INVENTOR.
WILBERT A. HEYMAN
BY
ATTORNEY.

Patented Nov. 22, 1938

2,137,243

UNITED STATES PATENT OFFICE 2,137,243

ARTICLE MADE FROM PERFORATED CELLULOSE SHEETS

Wilbert A. Heyman, New York, N. Y.

Application April 20, 1936, Serial No. 75,491

10 Claims. (Cl. 99—77)

This invention primarily relates to the production of a closed envelope or sack adapted to enclose a quantity of material from which an infusion is to be made, such for instance as an infusion produced by the action of hot water on ground coffee or, upon tea leaves or, other substances which have constituents partly or wholly soluble in hot water.

One of the objects of the invention is to provide an envelope or sack adapted to contain substances from which an infusion is to be made, through the walls of which water may more quickly and efficiently permeate, whereby the substance within the bag or sack will more quickly give up its soluble constituents than has obtained in bags or sacks employed for this purpose as hitherto constructed.

Another object of the invention is to provide an envelope or sack of the above type which may be constructed more cheaply than has obtained in such envelopes or sacks as hitherto constructed.

Another object of the invention is to provide a new and improved envelope for enclosing ground coffee which is translucent and which is provided with a multiplicity of water permeating apertures, which apertures are so minute in size that very fine particles of the ground coffee will not be shaken from said envelope before the same is used for the purpose intended.

Another object of the invention is to provide a new and improved method of producing the material out of which the envelope or sack is constructed.

Another object of the invention is to provide new and improved means for operating upon a sheet of translucent material whereby said minute apertures may be formed in an economical manner and whereby a greater number of said minute apertures may be provided in such a sheet than it has been possible to do by means hitherto constructed.

Other objects and aims of the invention, more or less specific than those referred to above, will be in part obvious and in part pointed out in the course of the following description of the elements, combinations, arrangements of parts and applications of principles, constituting the invention and also in the several steps of the process hereinafter described and the relation of each step to the others thereof and the scope of protection contemplated will be indicated in the appended claims.

In the accompanying drawings wherein I have illustrated preferred embodiments of my invention, Figure 1 is an elevational view of an envelope constructed in accordance with my invention, Figure 2 is a vertical sectional view taken through Figure 1, Figure 3 is a view similar to Figure 1 showing another embodiment of my invention, Figure 4 is a vertical sectional view taken through Figure 3, Figure 5 is an elevational view showing a larger imperforate envelope adapted to receive a plurality of the perforated envelopes ready for use, the construction being such that the aroma of the coffee will not be dissipated through the perforated envelope while the latter remains unused, Figure 6 is a vertical sectional view taken through the envelope illustrated in Figure 5, Figure 7 is an elevational view of a slightly modified form of envelope, Figure 8 is a sectional view taken through a mold utilized to provide a metallic base for supporting the needles and needle assembly being shown within the mold, Figure 9 is a view similar to Figure 8 showing a slightly different way of providing the needle assembly, Figure 10 is a top plan view of the needle assembly within the mold before the metal base for supporting the needles is incorporated into the assembly, Figure 11 is an elevational view showing the manner in which the needle assembly is employed to perforate a sheet of cellulose material in accordance with my invention, Figure 12 is an elevational view showing two needle assemblies in juxtaposed relation whereby an apparatus will be accomplished to be hereinafter described, and Figure 13 illustrates another form of mechanism for perforating the sheet of cellulose material.

Before proceeding to describe my invention, it may here be noted that hitherto bags, envelopes or sacks for making infusions of tea and other quickly infusible materials are of textile material such as cheesecloth and the like.

In my Patent No. 2,022,467, patented on November 26th, 1935, I have disclosed such a bag, sack or envelope to be used for making an infusion of a mixture of partly soluble coffee and soluble coffee in granular particle form, although, of course, I was not limited to the use of such a bag, sack or envelope in the aforementioned patent. While such a cloth bag operates in a satisfactory manner for the purpose intended, I find that if there are minute particles of coffee present in such a closed container there is danger of some of them falling out or sifting out through the mesh of the cloth. If a textile material having a very fine mesh is employed for this purpose, I find that when the threads become saturated with water, a slight swelling of the fibrous material occurs which substantially closes the interstices of the fabric, making it extremely difficult for the water to permeate the fabric quickly enough to obtain a satisfactory infusion before the water loses its heat to such an extent that the beverage becomes unpalatable.

Moreover, I have found that when a cloth bag such as is commonly employed for making infusions of either tea, coffee or other infusible substances is employed, it is difficult for the hot water quickly to permeate parts of the material, whereby a considerable portion of gases liberated by the action of the hot water on the cells are obstructed in their passage outwardly through the walls of the container. Bags or envelopes formed of textile material are also expensive to produce.

Moreover, if the mesh of the cloth is not sufficiently fine, particularly when used to make a cup of coffee within the cup by the use of boiling water, fine particles of coffee are forced through the mesh of the cloth and form dregs or sediment which settle to the bottom of the cup.

In carrying out my invention, I propose to utilize a transparent or translucent material formed of cellulose, more particularly Cellophane, which latter material is a sheet of cellulistic material coated on one or both sides, making it impervious to the passage of either air or water. The use of such material for forming envelopes adapted to contain infusible substances of a rather coarse nature is known. Such envelopes have been perforated so that water will readily pass into the interior of the envelope. I believe, however, that no envelopes of such a character have been produced hitherto for making coffee infusions, by reason of the fact that it has hitherto been impossible to provide apertures of such a number and of such a minute size in the envelope as would prevent the fine coffee particles from dusting out, while at the same time permitting an easy ingress of the water into the envelope or container. If apertures are cut into the material by means of dies, it has been found impossible to assemble a multiplicity of dies close enough together to cut clean apertures in this cellulistic material. On the other hand, if these minute apertures are formed by punching the said material, none of the material is removed from the body of the sheet and when the punched material is formed into a sack or envelope for containing the ground coffee from which the infusion is to be made, the material of the sheet being unremoved by the punching operation quickly closes the apertures under the influence of hot water whereby it is very difficult to obtain a satisfactory infusion. The gases escaping from the coffee also operate to restore the material surrounding the punched apertures back into the places from which they were merely pushed aside and this also tends to prevent such easy egress and exit of the water as will give the quick infusion necessary in producing a cup of coffee within the cup through the use of an individual envelope and boiling water.

I have found that by embedding a multiplicity of fine needles in a base of metal with the points of the needles extending from said metallic base and by heating said needles to an extent sufficient to burn said minute apertures in the cellulistic material, that I can produce a perforated material, the apertures of which both as to size and number having a given area, will accomplish my purpose.

I, therefore, propose to provide such an assembly of needles in a metallic base and apply sufficient heat to the metallic base whereby the needles will be heated to such a degree that when they come in contact with the sheet of cellulistic material, minute apertures will be burned therein and that such apertures will have cleanly defined edges, there being no material left surrounding said edges to be pushed back so as to close said apertures under the influence of the hot water and the gases above mentioned.

I shall now proceed to describe my invention, having reference to the accompanying drawings wherein similar reference characters refer to similar parts throughout the course of the description.

Referring now to the drawings, the reference numeral 1 denotes an envelope or sack preferably formed of cellulistic material, in the present instance, Cellophane, said material having been coated with a material which makes it impervious to both air and water. In the present instance, the envelope takes on substantially the form illustrated in Figures 2 and 3. This envelope is preferably sealed at each end after it has been filled with the material from which an infusion is to be made. In Figures 1 and 2, this sealing is effected by the application of heat to the ends of the envelope so that the superimposed layers of the material will be sealed together by cohesion or adhesion of the material itself. In Figures 3 and 4 of the drawings, the sealing is effected by metallic clips as shown. The ends of the envelope sealed as in Figures 1 and 2 of the drawings are indicated by the reference numerals 2 and 3, and the metallic clips which seal the embodiment shown in Figures 3 and 4 of the drawings are indicated at 4 and 5 respectively.

The material enclosed in the envelope in the present instance is coffee comprising a mixture of freshly ground coffee in granular particle form, such as disclosed in my aforementioned Patent No. 2,022,467, although, of course, other compounded preparations may be used in this envelope.

As shown in Figures 1 and 2, these envelopes are provided with a multiplicity of minute apertures, in the present instance, the apertures are intended to be so minute that the granular particles of coffee will not sift out of the envelope. I prefer to make these apertures of sizes ranging from five one thousandths (.005) to fifteen one thousandths (.015) having found that apertures of this size will prevent such small particles of coffee from escaping from the bag either before or during the course of the making of the infusion. In the first case the coffee particles are wasted and in the second instance the particles escape from the envelope during the making of the infusion and form sediment or dregs in the bottom of the cup. It is intended that there shall be a sufficient quantity of coffee enclosed in a single envelope as will produce a satisfactory cup of coffee within the cup simply by dropping one of these envelopes in the cup and pouring boiling water thereon, although, of course, larger envelopes may be employed whereby a number of cups may be provided, or an envelope large enough to make coffee as usually prepared wherein several cups are provided. The prime purpose of my invention, however, is to provide a suitable envelope whereby an individual cup of coffee may be prepared as above described.

It is desirable that these apertures which are denoted generally by the reference numeral 6 have clearly defined edges, that is to say, that the material formerly occupying the spaces formed by the apertures may be entirely removed so that there will be no danger of the hot water making the coffee infusion as it passes out of the container forcing the material back into the spaces occupied by the apertures and closing the apertures whereby it would be difficult to obtain a satisfactory result.

If holes are punched or pricked through the cellulistic material, such material as formerly occupying the spaces of the minute apertures is merely pushed aside. This material will be pushed back into place by the water containing the coffee infusion passing out of the enevelope as above described. It has been found impractical to provide a sufficient number of dies to provide such a multiplicity of minute apertures as is desirable whereby the dies would cut away the material in forming these apertures owing to the difficulty of providing such a close assembly of such dies as would produce a satisfactory envelope.

I have, therefore, provided a new and improved apparatus for accomplishing the result I desire to attain.

Referring now to Figures 8 to 12 inclusive, the reference numeral 7 denotes a box-like mold and in the bottom of this mold I place a sheet of fiber of relatively hard texture such as will not be punctured easily by the needle points. Superimposed upon this sheet of fiber 8 is a sheet of asbestos of relatively soft texture such as will be easily pierced by a needle. Superimposed upon this asbestos sheet is a wire mesh 10, the mesh of which is from fifteen one thousandths (.015) to twenty one thousandths (.020) of an inch in extent. The needles shown at 11 are inserted through the meshes of the wire screen 10 and into the asbestos sheet until they come into engagement with the fiber sheet 8 which forms a limiting stop for the needles whereby all of the needle points will lie in a common plane. The meshes of the wire screen form guides for the needles as they are inserted or pushed through the asbestos sheet 9. When the assembly has been made as illustrated in Figure 8, a fusible metal is poured into the mold whereby a substantially unitary structure is provided, the needles being firmly embedded into a block of fusible metal. Various alloys of aluminum may be employed for this last named purpose or, in fact, any suitable metal which would be heated to a predetermined desired temperature as hereinafter pointed out. This metal block containing the embedded needles is indicated by the reference numeral 12. Of course, if desired, the wire mesh may be removed before the metal alloy is poured into the mold, although this is not material because the said mesh furnishes a steady influence on the needles when the fusible metal is being poured into the mold.

When the metal is cooled, the block containing the embedded needles is removed from the mold and the asbestos sheet is removed from the needle points, leaving the latter exposed as clearly shown in Figure 11 of the drawings.

The purpose of selecting asbestos for the composition of the sheet 9, is that this material will not be affected by the heat of the fused metal when the latter is poured into the mold.

In Figure 9 of the drawings, I have shown a slightly different construction in which a material such as plaster of Paris 13 is used in the bottom of the mold and the fiber sheet is omitted. After the metal block having the embedded needles has been produced, this plaster of Paris may be washed out. I have found either manner of performing this operation as being satisfactory.

Figure 10 is a top plan view of the mold before the fused metal is poured therein showing the needle assembly within the mold.

Referring now to Figure 11 of the drawings which illustrates schematically the arrangement of the parts during the formation of the minute apertures, the reference numeral 14 denotes a platen having a sheet of pressed asbestos 15 positioned thereon. The reference numeral 16 denotes an electric heating unit which rests upon the needle block 17. The sheet of Cellophane is indicated at 18. The block 17, together with this heating unit may be raised by suitable mechanism, not shown, and when the block is raised, the sheet of Cellophane 18 may be fed by suitable mechanism, not shown, along the platen so that a fresh sheet of that material will be presented to the needle points as they descend. It is intended that the metallic block 17 will be heated to a sufficient extent by the electric heating element 16 that the needle points will have a heat to a sufficient degree communicated to them that when they pierce the sheet of cellulistic material, the material thereof directly under each needle will be burned away or destroyed whereby the edges of the minute perforations will be clean. It will be obvious that it is necessary merely to barely touch the sheet of cellulistic material by the needle points to attain this result. It has been found in practice that when these minute apertures are formed by these heated needles, the material surrounding each needle point retreats to a very slight degree, but to a sufficient degree to permit the needle point to be readily removed from the perforated cellulistic material.

In Figure 12 of the drawings, I have shown an arrangement of the metallic blocks for supporting the multiplicity of needles whereby even a closer assembly of apertures may be provided in the sheet of cellulistic material. In this arrangement of the metallic blocks, the needles of the two blocks are arranged in staggered relation to each other. That is to say, the needles of one block are arranged in staggered relation both transversally and longitudinally from each other so that when these needle assemblies are utilized in the manner hereinbefore described, the function of the first block of needles will be to form one set of apertures in the cellulistic sheet and the function of the other block will be to form another set of apertures in the cellulistic sheet, the apertures formed by one block being out of alinement both transversally and longitudinally with those of the other set. By this arrangement of the parts, double the number of apertures may be provided in the sheet of cellulistic material from over the apertures formed by the mechanism illustrated in Figure 11.

Referring now to Figure 13, it will be obvious that the needle assembly may be carried by a circular drum 19 supported at its ends by the brackets 20, and the rim 21 of the drum 19 being formed of a fusible metal as in the embodiment of the invention first above described. The needle assembly of the drum 19 co-operates with a surface of a cylinder 22 preferably formed of asbestos and carried upon a drum 23 mounted upon a suitable support 24. The Cellophane sheet 18 is fed between the two drums as clearly shown in this figure. In this embodiment of the invention, the metallic rim 21 may be heated by Bunsen burners, one of which is illustrated at 25, the gas for the burner being supplied by a pipe 26 which pases into the drum at the central point 27.

In Figure 7 I have shown a slightly different construction of the envelope, the latter being formed in two sections 28 and 29, separated by a line of stitching or other fastening means 30 into two compartments, it being intended that the apertures 31 in compartment 28 shall be slightly larger than the apertures 32 in the compartment 29. The compartment 28 is adapted to contain only soluble coffee, the particles of which are larger than those employed in the envelope 1. I have found that in this construction of the envelope, a cup of coffee may be produced with a greater rapidity than that illustrated in Figures 1 and 3, for the reason that the boiling hot water will quickly dissolve the soluble coffee to give strength to the beverage and that the partly soluble constituents of coffee contained in compartment 29 will be more quickly dissolved to give aroma to the coffee, the strength of which is provided by the soluble coffee in the compartment 28.

In Figures 5 and 6 of the drawings, I have shown a sack or envelope 33 which is formed of imperforate cellulistic material such as Cellophane, which is adapted to contain a plurality of the envelopes illustrated in Figures 1, 2 and 7. This bag or envelope has its end portion sealed together as at 34 and 35 whereby the aromatic material in the envelope 36 will not escape or be dissipated before it is to be used. The envelopes 36 are, of course, perforated ready for use.

The envelope 33, before it is sealed, may be subjected to sub-atmospheric pressure and then filled with an inert gas such as carbon dioxide, nitrogen or other inert gas which will further preserve the aromatic constituents of the envelopes containing the soluble and insoluble coffee, and said envelope 33 after being filled and sealed in the manner hereinbefore described, may be dipped in a waxy material and further sealed, thereby making said envelope absolutely tight against either air or water whereby the coffee with the envelope may be preserved for as long a time as desired without deterioration. If desired, the envelope 33, after being filled with the inert gas may be enclosed in another envelope which, after the air is exhausted therefrom, may be sealed.

I have found in practice that my method of operating upon a sheet of cellulistic material to provide the closely assembled minute apertures may be carried out at temperatures which are lower than those necessary to burn the cellulistic material in providing the apertures; for example, Cellophane comprises a sheet of transparent cellulistic material which has been lacquered to make it air tight and water tight. This lacquer will melt or fuse at a temperature much lower than that at which the cellulistic material will burn. Therefore, when the needle points prick the cellulistic material, the lacquer will melt, and the melted lacquer binds the parts of the cellulistic material which have been displaced by the needle points and prevent the displaced parts from assuming their original positions whereby the apertures would be closed.

There are also other thin transparent materials known in the art which are cellulistic in character. Some of these are composed of Latox. In employing my method of such materials which are fusible under heat, the needle points will merely fuse the melting of the material rather than burn it in providing the minute apertures in the material.

It will accordingly be seen that I have provided an individual coffee envelope, a method of producing the same, and an apparatus for carrying out the process wherein is attained all of the ends and objects above enumerated in a most facile manner. An envelope such as described permits a very rapid infusion of the coffee. The size of the minute apertures is not affected by the boiling hot water, and said boiling hot water can more easily permeate the envelope than when the latter is formed of a textile material. Moreover, my process of operating upon the cellulistic material to form the apertures produces a greater number thereof, and a smaller size can be provided than has hitherto been produced by other methods. Moreover, the apparatus for carrying out the method is of simple construction and very easily operated.

As many changes could be made in this construction without departing from the scope of the following claims, it is intended that all matter contained in the above description or shown in the accompanying drawings shall be interpreted as illustrative only and not in a limiting sense.

Having thus described my invention what I claim as new and desire to secure by Letters Patent is:

1. As an article of manufacture, an envelope provided with a plurality of closely associated minute apertures, said envelope being divided into two compartments, and the apertures of one of said compartments being larger than those provided in the other thereof.

2. As a new article of manufacture, a flexible envelope composed of perforated cellulistic material divided into two compartments, one of which is adapted to contain partly soluble coffee and the other soluble coffee, the perforations in one of said compartments being larger than those in the other of said compartments.

3. As a new article of manufacture, an imperforate envelope adapted to receive a plurality of smaller perforated envelopes, each of which contains a quantity of infusible material such as coffee and said first named envelope being sealed against the entrance of either air or water.

4. As a new article of manufacture, an imperforate envelope containing a plurality of perforated envelopes, the latter containing coffee or other infusible substances, said imperforate envelope being sealed against the entrance of either air or water.

5. As a new article of manufacture, a flexible envelope provided with a plurality of closely associated apertures formed by heated needle points, said envelope being divided into two compartments.

6. As a new article of manufacture, a flexible envelope having a plurality of closely associated apertures formed by heated needle points, said the apertures provided in one of said compartments being much larger than those provided in the other of said compartments.

7. As a new article of manufacture, an imperforate envelope containing an inert gas and adapted to receive a plurality of smaller perforated envelopes, each of which contains a quantity of infusible material such as coffee, and said imperforate envelope being sealed against the entrance of either air or water.

8. As a new article of manufacture, a flexible envelope provided with a plurality of closely associated apertures formed by heated needle points and a quantity of infusible material located within said envelope.

9. As a new article of manufacture, an imperforate envelope containing a plurality of perforated envelopes, the latter containing coffee or other infusible substances, the air initially present in said perforated envelope having been replaced by an inert gas, and said imperforate envelope being sealed against the entrance of either air or water.

10. As a new article of manufacture, a flexible envelope having a plurality of closely associated apertures formed by needle points, said envelope being divided into two compartments, the apertures provided in one of said compartments being larger than those provided in the other of said compartments, a quantity of partly soluble coffee being provided in one of said compartments, and a quantity of soluble coffee being provided in the other of said compartments.

WILBERT A. HEYMAN.